United States Patent
Cowen et al.

(10) Patent No.: US 10,591,041 B2
(45) Date of Patent: Mar. 17, 2020

(54) LAMINATED SPROCKET ASSEMBLY

(71) Applicant: Schaeffler Technologies AG & Co. KG, Herzogenaurach (DE)

(72) Inventors: Gregory Cowen, Windsor (CA); Jesse Myers, Waterford, MI (US); Anuj Sahai, Rochester Hills, MI (US); Lucian Botez, Novi, MI (US); Jeffrey Hewitt, Windsor (CA)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 232 days.

(21) Appl. No.: 15/710,213

(22) Filed: Sep. 20, 2017

(65) Prior Publication Data

US 2018/0010679 A1    Jan. 11, 2018

Related U.S. Application Data (62) Division of application No. 15/007,628, filed on Jan. 27, 2016, now Pat. No. 9,803,738, which is a division of application No. 14/307,895, filed on Jun. 18, 2014, now abandoned.

(60) Provisional application No. 61/844,094, filed on Jul. 9, 2013.

(51) Int. Cl.
| | |
|---|---|
| *F16H 55/30* | (2006.01) |
| *F16H 55/17* | (2006.01) |
| *F16H 57/04* | (2010.01) |
| *F16H 57/05* | (2006.01) |

(52) U.S. Cl.
CPC ............. *F16H 55/30* (2013.01); *F16H 55/17* (2013.01); *F16H 57/0431* (2013.01); *F16H 57/05* (2013.01)

(58) Field of Classification Search
CPC .... B65G 23/06; B65G 17/08; B65G 2201/02; B65G 207/30; B23P 15/14
USPC ............................................ 474/152, 157, 91
See application file for complete search history.

(56) References Cited

U.S. PATENT DOCUMENTS

| | | | | | |
|---|---|---|---|---|---|
| 1,201,748 | A | * | 10/1916 | Luce ...................... | F16H 55/30 474/156 |
| 1,835,406 | A | * | 12/1931 | Kirsten .................... | F16G 13/04 474/156 |
| 2,823,553 | A | * | 2/1958 | Harrington ........... | F16C 19/163 474/91 |
| 4,321,750 | A | * | 3/1982 | Sugihara ................. | B27B 17/12 30/384 |
| 4,355,992 | A | * | 10/1982 | Ladin ..................... | F16H 55/30 277/353 |
| 5,074,406 | A | * | 12/1991 | Gundlach ............... | B23P 15/14 198/834 |
| 5,170,883 | A | * | 12/1992 | Ledet ..................... | B23P 15/14 198/834 |
| 5,263,575 | A | * | 11/1993 | Ledet ..................... | B23P 15/14 198/834 |

(Continued)

*Primary Examiner* — Henry Y Liu
(74) *Attorney, Agent, or Firm* — Volpe and Koenig, P.C.

(57) ABSTRACT

A laminated sprocket assembly is provided formed of a plurality of layers that are connected together. Each of the layers is a stamped sheet metal layer having a plurality of spaced apart teeth located around a periphery thereof. The teeth in the plurality of connected layers are aligned. At least one of voids, channels, openings, or recesses are located in or between at least some of the layers for receiving and holding lubricating oil. This reduces noise and wear.

8 Claims, 8 Drawing Sheets

(56) References Cited

U.S. PATENT DOCUMENTS

| | | | | |
|---|---|---|---|---|
| 5,316,522 A | * | 5/1994 | Carbone | ............... F16H 55/12 474/95 |
| 2007/0161443 A1 | * | 7/2007 | Krisl | ............... B65G 23/06 474/95 |
| 2014/0335983 A1 | * | 11/2014 | Iwai | ............... B62M 9/105 474/78 |
| 2014/0335987 A1 | * | 11/2014 | Iwai | ............... B62M 9/10 474/161 |

* cited by examiner

LAMINATED SPROCKET ASSEMBLY

INCORPORATION BY REFERENCE

The following documents are incorporated herein by reference as if fully set forth: U.S. Provisional Patent Application No. 61/844,094, filed Jul. 9, 2013; U.S. patent application Ser. No. 14/307,895, filed Jun. 18, 2014; and U.S. patent application Ser. No. 15/007,628, filed Jan. 27, 2016.

FIELD OF INVENTION

The present invention relates to a sprocket assembly and in particular to a laminated sprocket assembly.

BACKGROUND

Laminated sprocket assemblies formed with a plurality of layers that are bonded or welded together are known. For example, U.S. Pat. No. 5,074,406 teaches such a laminated sprocket in which each of the layers includes a central opening for fitting onto a drive shaft. Teeth or other driving surfaces are formed around the periphery of the layers and the layers can be stacked with spacers located between the layers so that the teeth are spaced apart for example to carry a chain conveyor or belt conveyor having pockets in which the teeth of the laminated sprocket are engaged.

In the field of automotive engines, sprockets are used in connection with timing chains and timing drives and for various other purposes. Generally such sprockets have been formed as a solid machined part or a sintered part due to the high speeds and loads with which such sprockets operate. However, such machined or sintered sprockets are associated with higher costs.

It would be desirable to provide a laminated sprocket which would be suitable for use in connection with high speed equipment, and particularly for use as timing chain sprockets and/or other sprockets used in connection with internal combustion engines.

SUMMARY

A laminated sprocket assembly is provided formed of a plurality of layers that are connected together. Each of the layers is a stamped sheet metal layer having a plurality of spaced apart teeth located around a periphery thereof. The teeth in the plurality of connected layers are aligned. At least one of voids, channels, openings, or recesses are located in or between at least some of the layers for receiving and holding lubricating oil.

Preferably, each of the stamped or punched sheet metal layers includes a shaft opening. Additional aligned openings may be defined in each of the layers in a position spaced apart from the shaft opening and the teeth which can be used to contain lubricating oil. In one preferred aspect, voids are located between the sheet metal layers used to form the laminated sprocket assembly and lubricating oil is retained in and/or seeps through these layers to provide lubrication at the surfaces of the teeth. Lubricant can be received through the aligned openings located in the layers at a position spaced apart from the shaft opening and teeth.

Additionally, it is possible to have recesses located in at least some of the layers in the face, flank, or undercut (generally referred to as the tooth side) of each of the teeth with these recesses preferably being formed by a radius, and the layers on either side of the layers with the recesses including teeth having sides without recesses in order to form pockets for retaining lubricating oil. This provides for noise reduction and lubrication.

In another aspect, each of the layers includes a shaft opening, and at least some of the layers include a channel that extends from the shaft opening to a periphery of the laminated sprocket assembly. In one aspect, the channel can be defined by a slot extending through the layer with the slot preferably being punched in the sheet metal layer as each layer is being formed. Preferably, the layers adjacent to the slot are solid, at least in the area of the slot, in order to define a confined channel. A plurality of channels is provided that preferably extend generally radially and are spaced apart in a peripheral direction. Preferably, each of the channels ends at an opening in a side of one of the teeth so that oil can be fed from the shaft upon which the laminated sprocket assembly is mounted through the channels to the teeth where a chain is engaged. The openings of the channels are preferably axially and peripherally spaced apart from one another so that several or all of the teeth include an opening for a lubrication channel.

It is also possible for one of the channels to be defined by slots of two adjacent ones of the layers, for example with the slots in one of the layers extending only part way from the shaft opening toward the teeth and the slots in the adjacent layer extending from the position partway between the shaft opening and the teeth to the openings in the teeth surfaces.

One or more of the above features can be combined in order to provide a laminated sprocket assembly that includes a feature to retain or provide lubrication in order to provide noise reduction and reduced wear.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Certain terminology is used in the following description for convenience only and is not limiting. The words "front," "rear," "upper" and "lower" designate directions in the drawings to which reference is made. The words "inwardly" and "outwardly" refer to directions toward and away from the parts referenced in the drawings. "Axially" refers to a direction along the axis of a shaft. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

Referring now to FIGS. 1-5, a first embodiment of a laminated sprocket assembly 10 is shown. The laminated sprocket assembly 10 includes a plurality of layers 12 that are connected together, with each of the layers 12 being a stamped or punched sheet metal layer having a plurality of spaced apart teeth 14 located around a periphery thereof. Stamping or punching are used synonymously herein, and allow the layers to be produced cheaply. The teeth 14 of the plurality of layers 12 to be connected are aligned. Preferably a shaft opening 11 extends through each of the layers and is adapted to receive a shaft when the sprocket assembly is installed, for example on a camshaft of an internal combustion engine. According to the first preferred embodiment of the laminated sprocket assembly 10, the aligned layers 12 are connected together by bonding, welding or any other suitable means.

Figure 1:
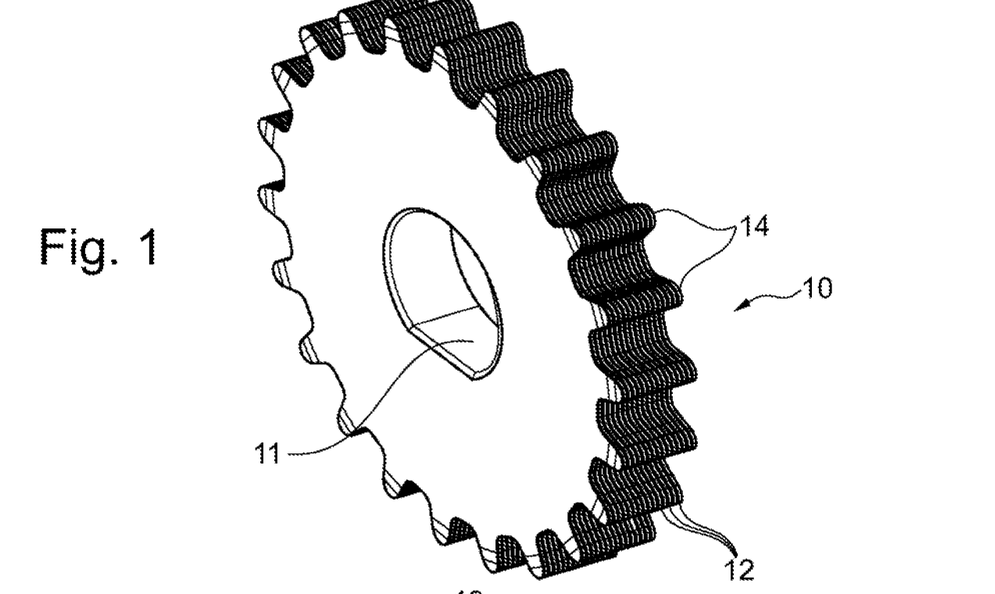
FIG. 1 is a perspective view of a first embodiment of a laminated sprocket assembly according to the invention.
Figure 2:
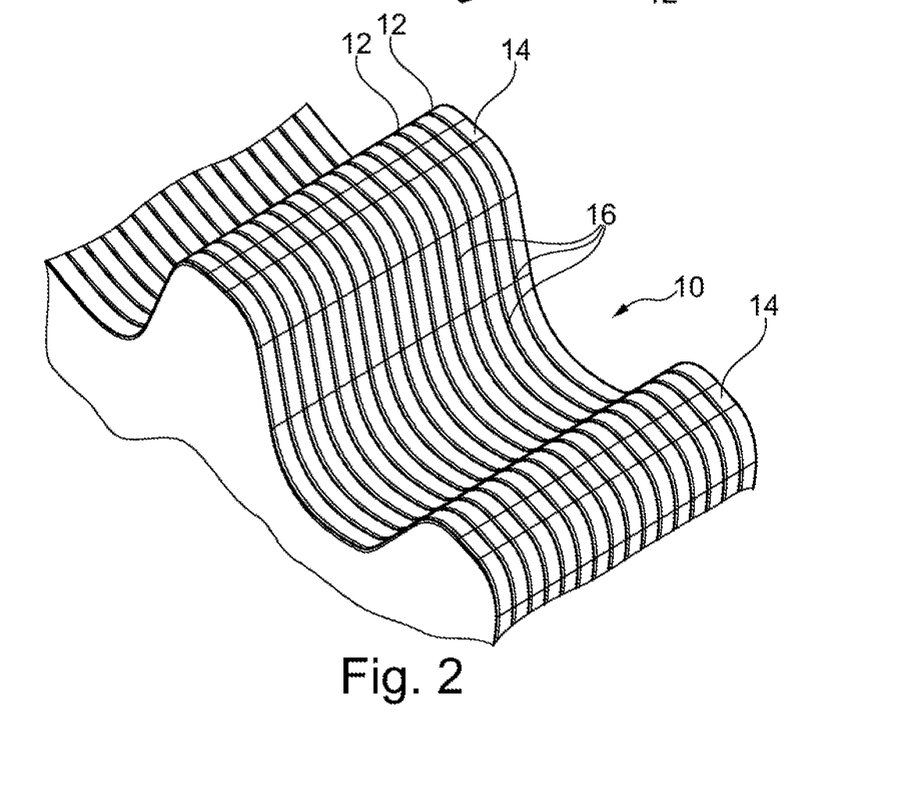
FIG. 2 is an enlarged detail showing the teeth of the laminated sprocket assembly of FIG. 1.
Figure 3:
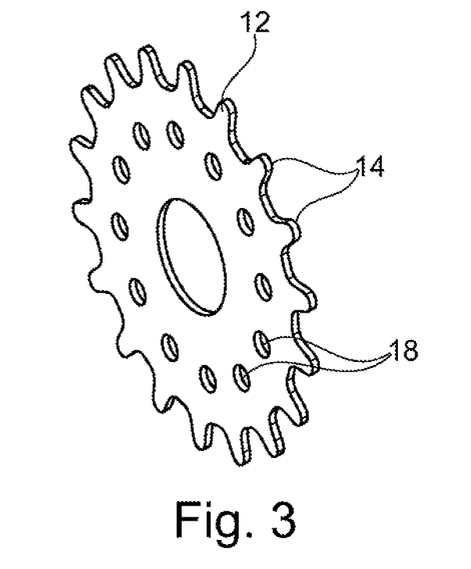
FIG. 3 is a perspective view of a single layer used in forming a laminated sprocket assembly.
Figure 4:
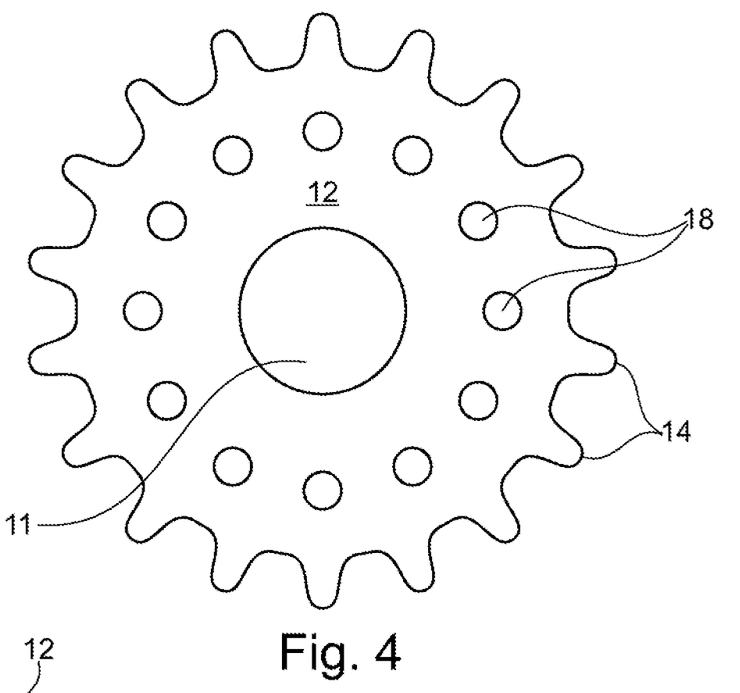
FIG. 4 is a plan view of the single layer shown in FIG. 3.
Figure 5:
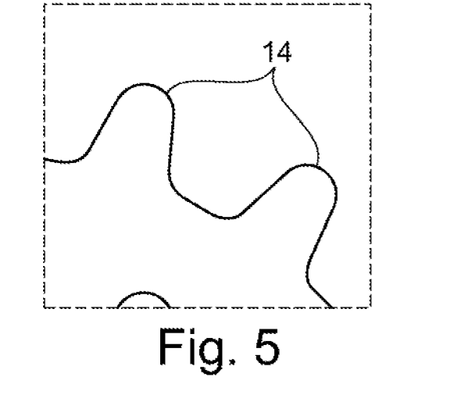
FIG. 5 is an enlarged view showing a preferred tooth configuration of the layer in FIG. 4.

In the first preferred embodiment of the laminated sprocket assembly 10, voids 16 are located in or between at least some of the layers 12 for receiving lubricating oil. These voids indicated as 16 in FIG. 2 can be the result of unevenness in the layers generated by the stamping process or can be specifically designed through unevenness introduced in the stamping dies used to form the sheet metal layers 12. This provides small gaps for residual oil to be retained. In order to feed lubricating oil to these small residual gaps, it is also possible to provide openings 18 for lubrication to penetrate into the laminated sprocket assembly 10 as shown in FIGS. 3 and 4. Here, a single layer 12 is shown which can be used in the embodiment of FIG. 1 which is shown without the openings 18. The profile of the teeth 14 is adapted to the particular application for use with a chain of a particular design. Depending upon the application, steel sheet metal is utilized which can be hardened.

Figure 6:
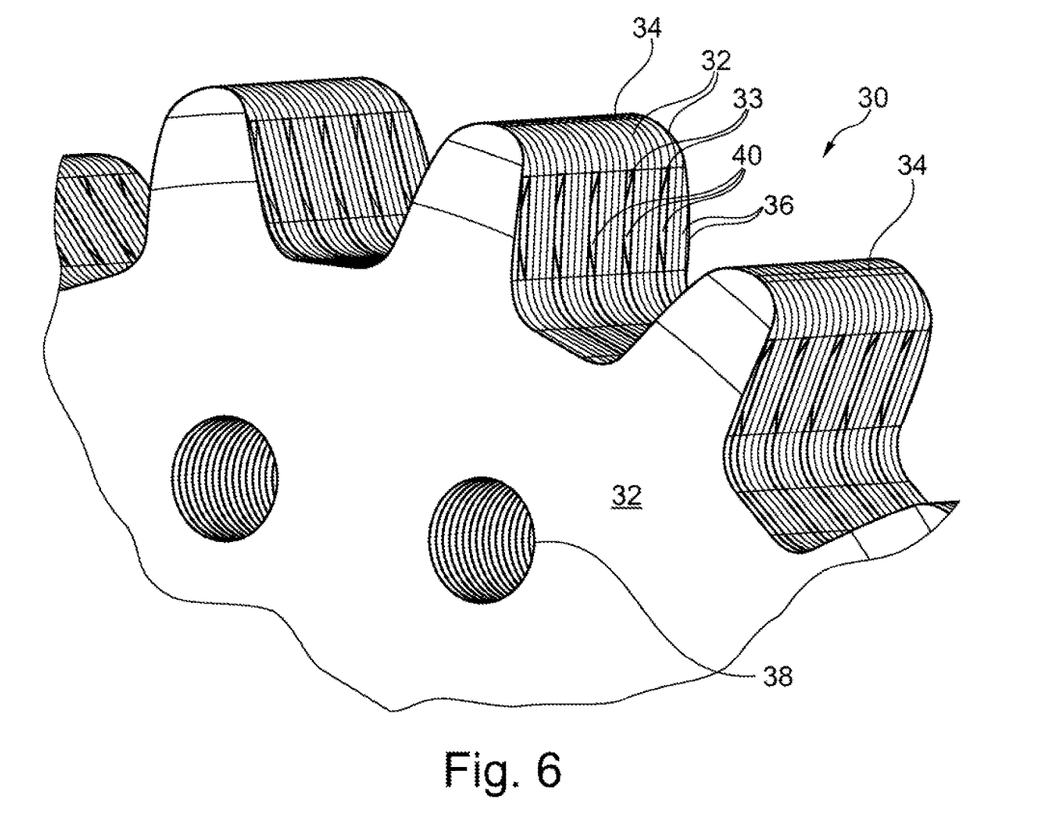
FIG. 6 is an enlarged perspective view showing a second embodiment of a sprocket assembly according to the invention with recesses located in a side of the teeth.
Figure 7:
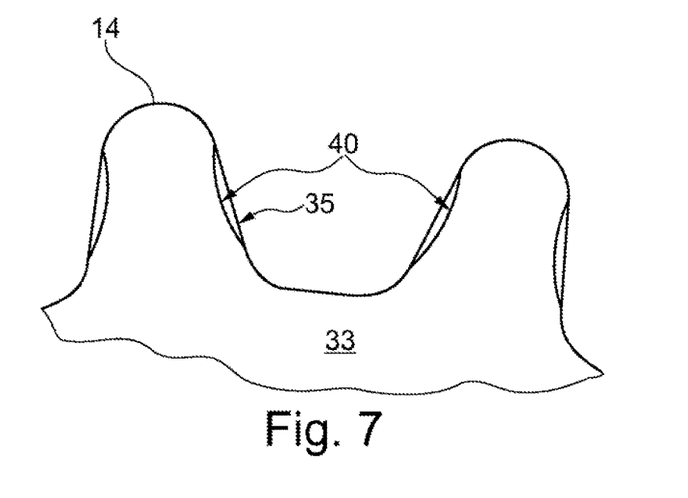
FIG. 7 is a partial plan view showing two layers used to form the sprocket assembly of FIG. 6 with the top layer including recesses being placed upon an adjacent layer that does not include recesses in the sides of each of the teeth.
Figure 8:
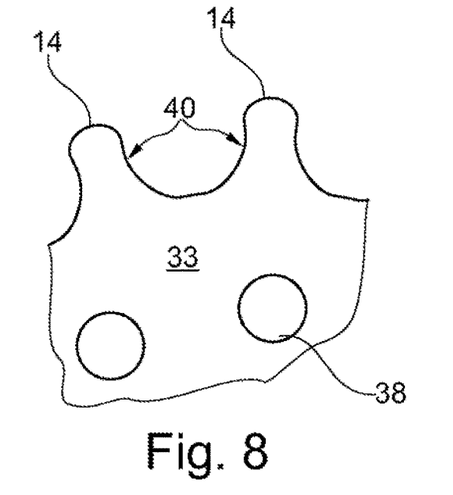
FIG. 8 is a partial plan view showing a layer having teeth with recesses as used in the sprocket assembly of FIG. 6.

Referring now to FIGS. 6-10, a second embodiment of a laminated sprocket assembly 30 is shown. The laminated sprocket assembly 30 is similar to the laminated sprocket assembly 10 and includes a shaft opening 31, shown in FIG. 10, as well as teeth 34, located around a periphery of the layers 32, 33 that are laminated together in order to form the sprocket assembly 30. In the laminated sprocket assembly 30, recesses 40 are located in at least some of the layers 33, preferably in one or both sides 35 of each of the teeth 34. The recesses 40 are preferably formed by a radius. However, other shapes could be utilized. Preferably, the layers 32 on either side of the layers 33 with the recesses 40 include teeth 34 having sides 35 without the recesses. Preferably, the layer 33 with the recesses 40 is located as every second, third, fourth, or fifth layer in the sprocket 30, with the remaining layers 32 not having recesses so that a series of pockets 44 are spaced apart across the axial surface of each tooth 34. As shown in FIGS. 6 and 8, openings 38 can also be provided in a position spaced apart from the shaft opening 31 and the teeth 34. These can be used in order for lubrication to be introduced into the laminated sprocket assembly 30 which can travel through the voids 36 between layers radially outwardly due to centrifugal force as the sprocket 30 turns to lubricate the chain contact surfaces of the teeth 34. The recesses 40 allow for residual oil to be held on the tooth surface.

Figure 9:
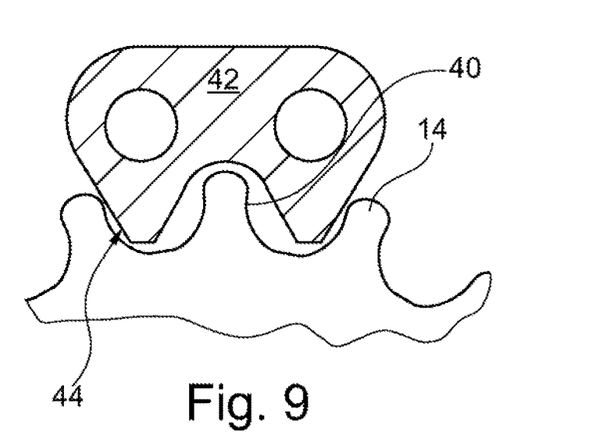
FIG. 9 is an enlarged view showing pockets formed between the recesses and the chain links.
Figure 10:
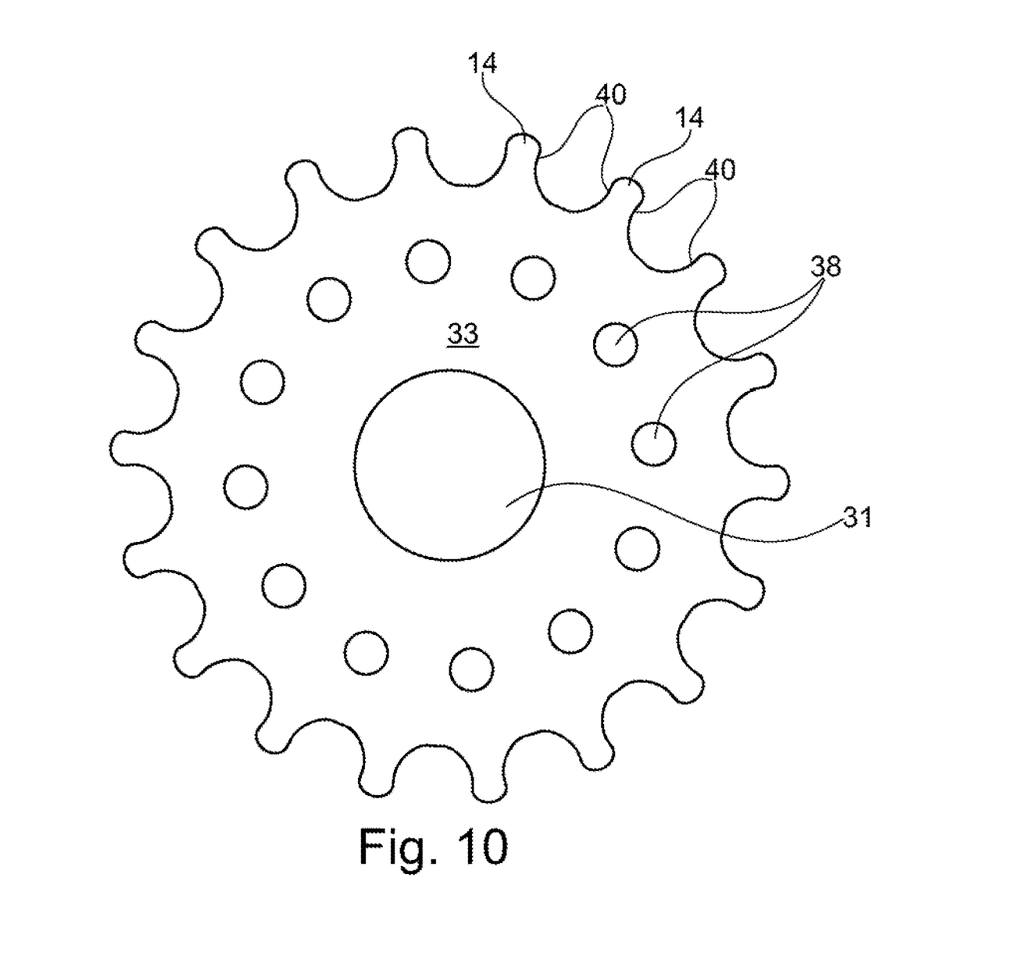
FIG. 10 is a plan view showing a layer in which the teeth include recesses.

As shown in FIG. 9, the pockets 44 formed by the recesses 40 provide an area for lubricating oil to be held between the tooth surfaces and a chain link 42 when the laminated sprocket assembly 30 is in use. This provides a lubricant holding area for cushioning and sound deadening as well as lubrication in use.

Figure 11:
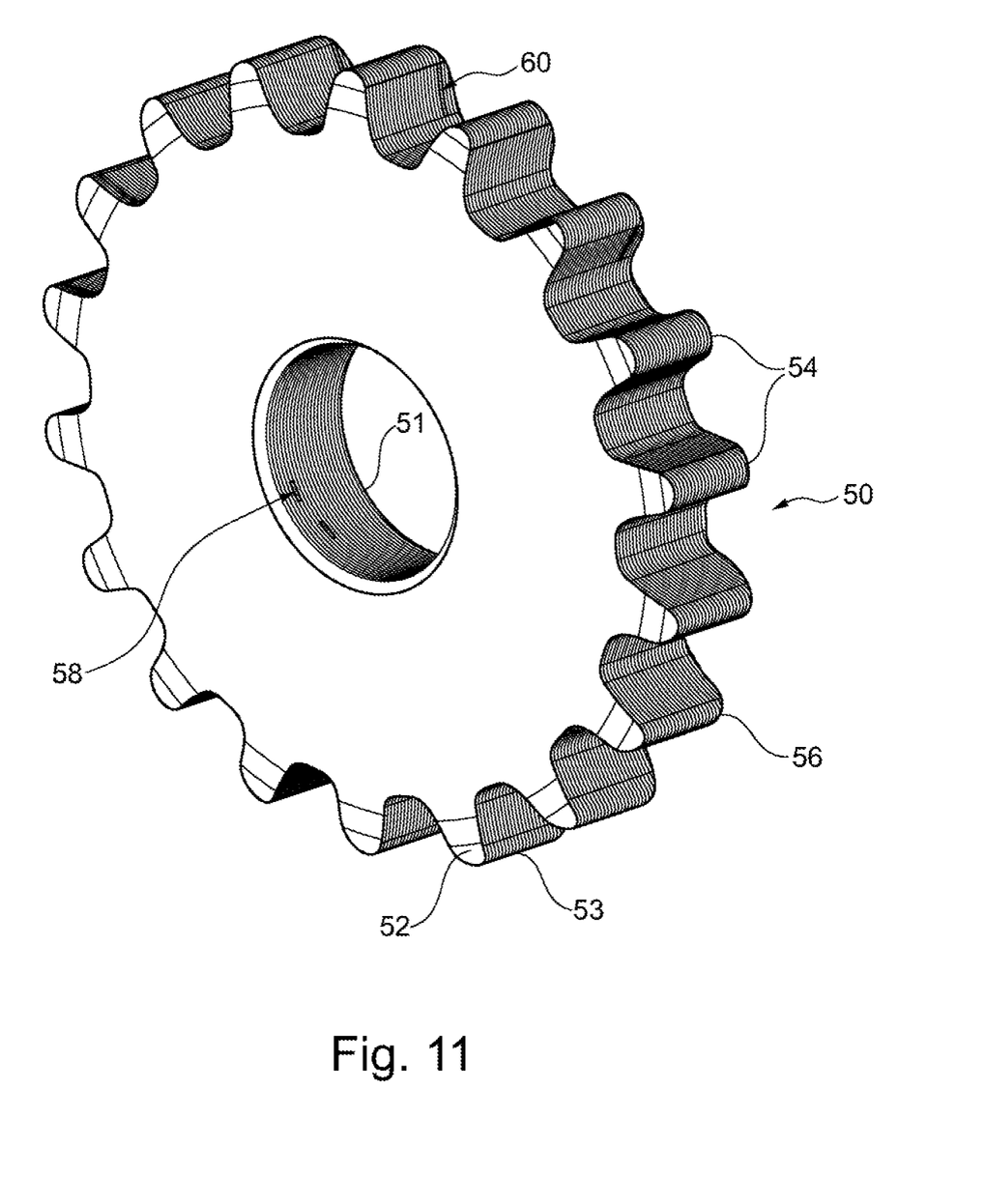
FIG. 11 is a perspective view of a third embodiment of a laminated sprocket assembly according to the invention.
Figure 12:
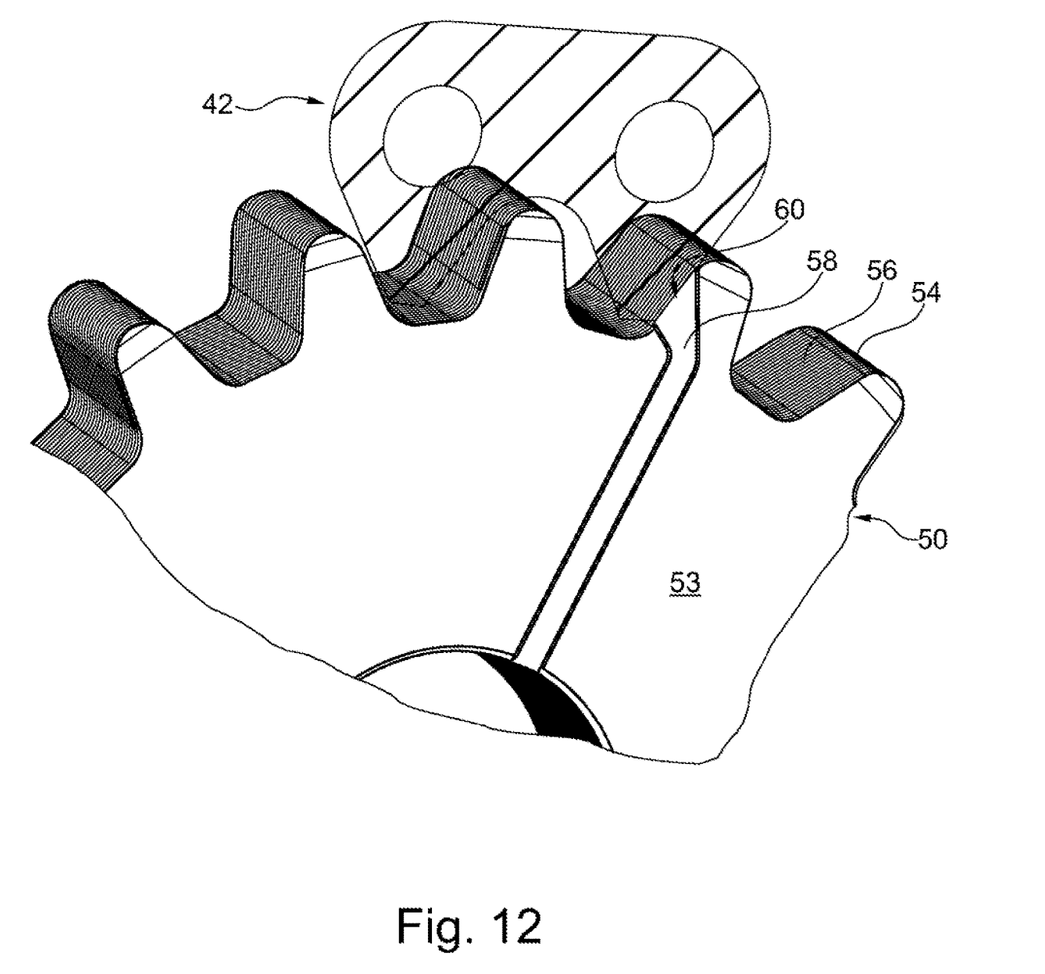
FIG. 12 is a partial perspective view showing a partially assembled sprocket assembly with an oil feed channel in one layer extending between the shaft opening and the teeth.
Figure 13:
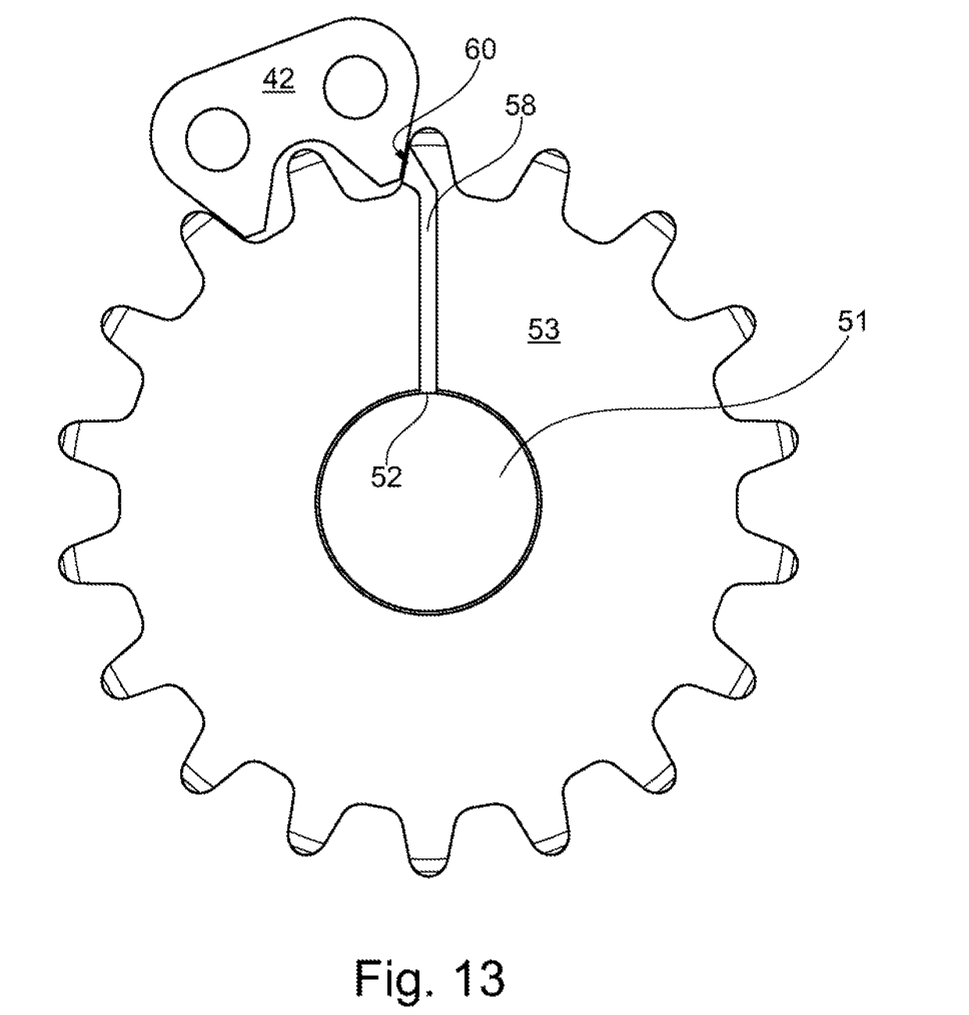
FIG. 13 is a plan view showing one layer used in the sprocket assembly of FIG. 11 having the oil feed channel that is placed on an adjacent layer that does not include the oil feed channel.
Figure 14:
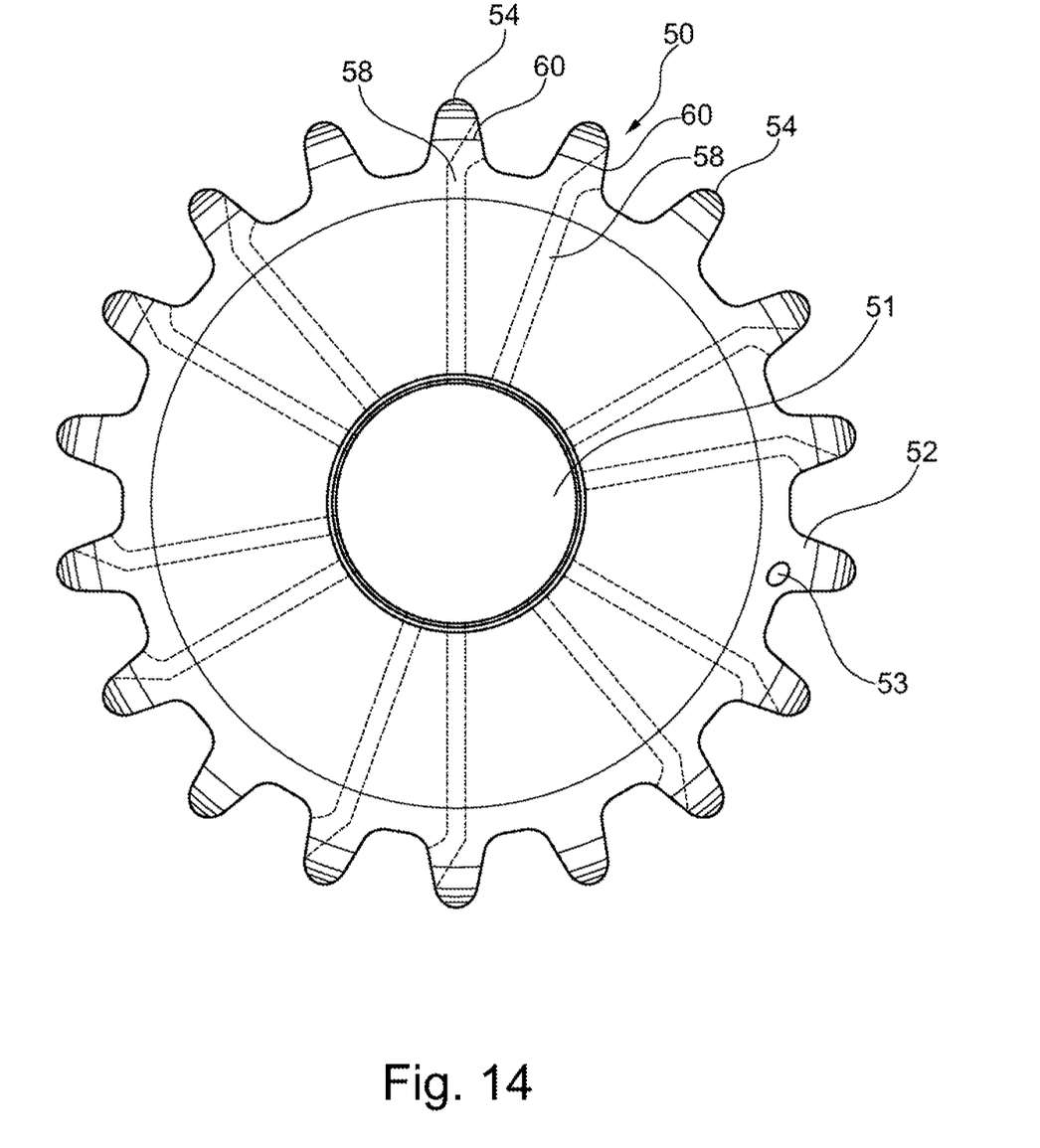
FIG. 14 is a plan view showing a plurality of oil feed channels located within the sprocket assembly shown in FIG. 11.

Referring now to FIGS. 11-14, a third embodiment of a laminated sprocket assembly 50 is shown. The laminated sprocket assembly 50 is similar to the laminated sprocket assemblies 10 and 30 in that it is formed from a plurality of layers 52, 53 which are stamped sheet metal layers and have a plurality of teeth 54 located around a periphery thereof. Each of the layers include a shaft opening 51 so that the laminated sprocket assembly 50 can be mounted on a shaft. Here, as shown in FIG. 11, oil channels 58 extend through at least some of the layers 53 from the shaft opening 51 to an oil opening on a periphery of the sprocket assembly 50. As shown in detail in FIGS. 12-14, preferably the oil channels 58 include an oil exit opening 60 located on a side 55 of at least some of the teeth 54. The channels 58 are preferably defined as a slot that extends through the layer 53. FIG. 13 shows one layer 53 including the slot stacked on top of a layer 52 that either does not include the slot or includes a slot rotated to a different radial position. In a preferred embodiment, the layers 53 which include the slot to form the oil channel 58 have an adjacent layer 52 that does not include a slot and therefore forms a solid disc rather than a slotted disc. Alternatively, layers 53 that include the slots can be located adjacent to one another with the slots rotated to different peripheral positions, for example as shown in FIG. 14. In the preferred embodiment, the channels 58 extend generally radially and are spaced apart in the peripheral direction. While a single slot through a layer 53 is shown as forming one complete channel in FIGS. 12 and 13, it is also possible to provide one channel 58 that extends from the shaft opening 51 to a periphery of the laminated sprocket assembly 50 by slots defined in two adjacent layers. For example, a slot in one layer can extend from the shaft opening part of the way to the periphery of the laminated sprocket assembly 50 while the slot in the adjacent layer can extend from the part way position to the periphery. In a preferred embodiment, the channel 58 has an opening 60 located in a side of a respective tooth 54 and, preferably openings 60 of the channels 58 in a single sprocket assembly 50 are axially and peripherally spaced apart from one another in order to provide a generally uniform distribution of lubrication channels 58 to the various peripheral areas of the laminated sprocket assembly 50 as shown in FIG. 14.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A laminated sprocket assembly, comprising:
    a plurality of layers that are connected together, each of the layers being a stamped sheet metal layer having a plurality of spaced apart teeth located around a periphery thereof, and the teeth in the plurality of connected layers are aligned; and
    at least one of voids, channels, openings, or recesses being located in or between at least some of the layers for receiving lubricating oil,
    wherein each of the layers includes a shaft opening, and at least some of the layers define at least one channel that extends from the shaft opening to a periphery of the laminated sprocket assembly.

2. The laminated sprocket assembly of claim 1, wherein the channel is defined by a slot extending through the layer.

3. The laminated sprocket assembly of claim 2, wherein the slot is punched in the sheet metal layer.

4. The laminated sprocket assembly of claim 2, wherein the layers adjacent to the slot are solid, at least in an area of the slot, to define the channel.

5. The laminated sprocket assembly of claim 1, wherein the channels extend generally radially and are spaced apart in a peripheral direction.

6. The laminated sprocket assembly of claim 1, wherein one of the channels is defined by slots in two adjacent layers.

7. The laminated sprocket assembly of claim 1, wherein the channel has an opening in a side of one of the teeth.

8. The laminated sprocket assembly of claim 1, wherein the openings of the channels are axially and peripherally spaced apart from one another.

* * * * *